United States Patent [19]
Hattori

[11] Patent Number: 4,604,082
[45] Date of Patent: Aug. 5, 1986

[54] V-BELT MECHANISM

[75] Inventor: Torao Hattori, Saitama, Japan

[73] Assignee: Honda Giken Kogyo Kabushiki Kaisha, Tokyo, Japan

[21] Appl. No.: 536,252

[22] Filed: Sep. 27, 1983

[30] Foreign Application Priority Data

Sep. 29, 1982 [JP]  Japan .................................. 57-168434

[51] Int. Cl.[4] .............................................. F16G 1/21
[52] U.S. Cl. .................................................... 474/242
[58] Field of Search ............... 474/177, 190, 191, 201, 474/242

[56] References Cited

U.S. PATENT DOCUMENTS

| | | | |
|---|---|---|---|
| 1,376,742 | 5/1921 | Burnett | 474/191 X |
| 1,748,100 | 2/1930 | Avery | 474/191 X |
| 3,494,212 | 2/1970 | Thomson | 474/177 X |
| 4,386,922 | 6/1983 | Ivey | 474/201 X |

Primary Examiner—James A. Leppink
Assistant Examiner—Frank McKenzie
Attorney, Agent, or Firm—Lyon & Lyon

[57] ABSTRACT

A V-belt transmission mechanism having a V-belt of metallic blocks with inclined surfaces and pulleys having V-grooves about the periphery thereof. The V-belt includes tension strips extending in a continuous loop in cooperation with the blocks, a rubber holding belt and rollers between blocks. The pulleys include coatings of resilient material fused to the V-grooves of the pulleys.

2 Claims, 8 Drawing Figures

FIG. 4.
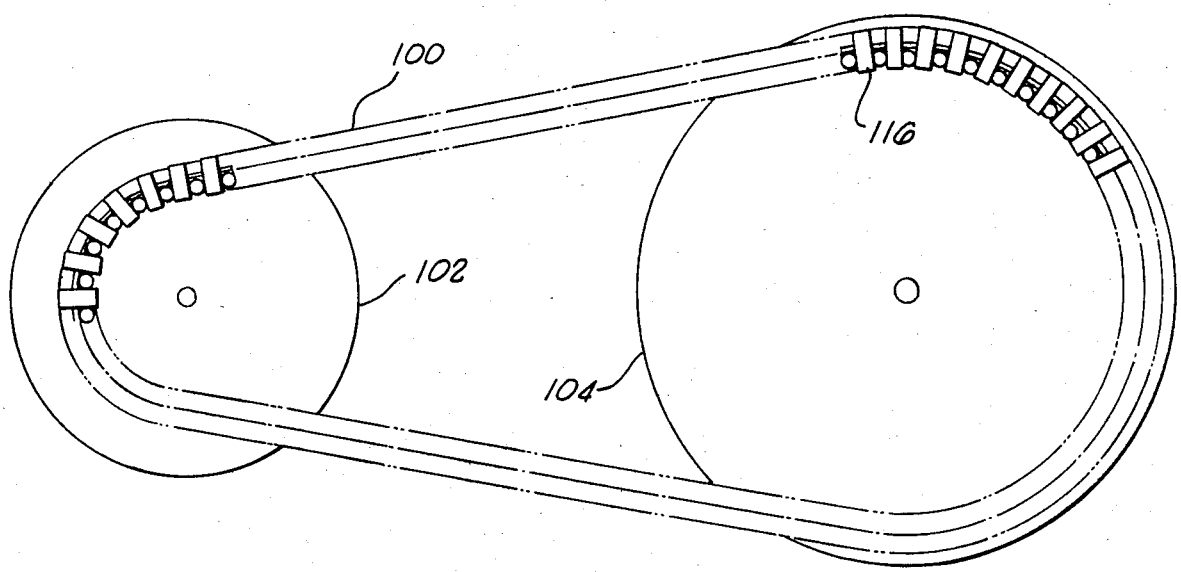
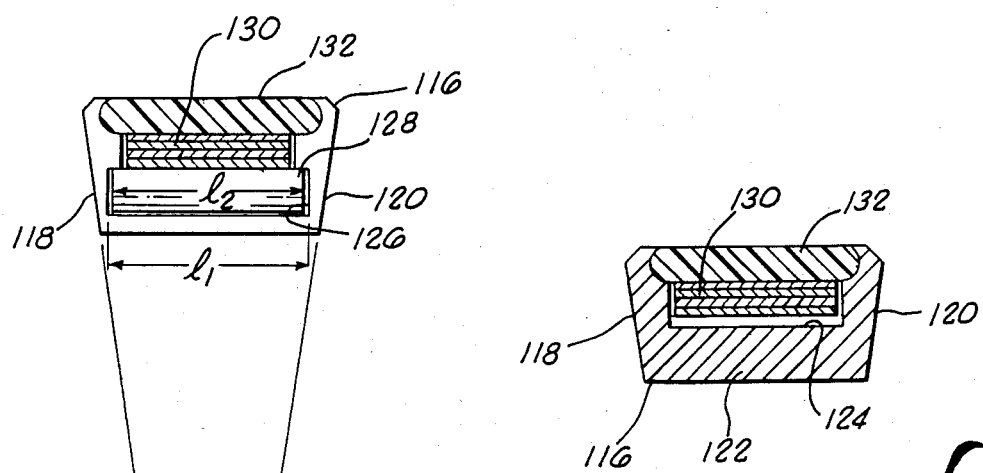
FIG. 5.
FIG. 6.
FIG. 7.
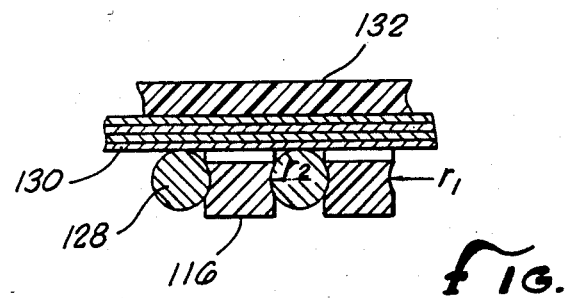

V-BELT MECHANISM

BACKGROUND OF THE INVENTION

The field of the present invention is V-Belt drive mechanisms.

V-belt mechanisms generally employ a V-belt with one or more pulleys having an annular V-groove for receipt of the belt. Such V-belts include inclined faces which mate with the pulley groove. Tension in the belt causes the belt to be wedged into compressed contact with the pulley groove.

Traditionally, V-belts have generally been of resilient, rubber-like material of reinforced construction riding in metal pulleys. The coefficient of friction between such materials resulted in good power transmission. The combination of materials also allowed adequate heat transfer from the pulley and minimized wear. However, such mechanisms were limited in the capacity to transmit large forces. FIG. 1 illustrates a prior art V-belt of this construction. In environments where high force transmission was required, rubber belts are limited in stress, tension and side pressures. Metal belts have been developed to accommodate higher loads. Because of the metal-to-metal contact between belt and pulleys, lubricant became necessary. Lubrication systems and lubricated components have the problems of additional complexity, contamination, required service and the like. Additionally, the lubricant needed for reasonable mechanism longevity also operated to reduce the required friction between the belt and the pulleys. Furthermore, the friction which was generated in such a system is subject to inconsistent conditions depending on oil film thickness, viscosity and the like. Thus, V-belt systems have remained somewhat limited in operation and utility.

SUMMARY OF THE INVENTION

The present invention pertains to a V-belt mechanism capable of transmitting power between pulleys. A V-belt is employed having hard inclined faces. Such V-belt construction may include available metal V-belt designs. The pulley or pulleys associated with the V-belt in the present mechanism include a resilient coating within the annular groove of the V-belt. A rigid pulley structure supports the resilient coating material.

Though use of a rigid material on the V-belt with a resilient coating on the companion pulley or pulleys, no lubricant is required. As a result, maximum available friction is realized without inconsistencies resulting from variations in the lubricant film. At the same time, advantages associated with metal V-belt construction may be achieved including smaller belt deformation, larger tension forces, reduced internal frictional heat and minimum hysteresis. The employment of a coating of resilient material on the pulley structure provides higher friction, accommodation of belt anomalies, adequate heat transfer through the thin coating to the V-belt pulley and the ability to accommodate relatively substantial forces.

Accordingly, it is an object of the present invention to provide an improved V-belt drive mechanism. Other and further objects and advantages will appear hereinafter.

BRIEF DESCRIPTION OF THE DRAWINGS

FIG. 4 is a side elevation of a belt of the present invention.

FIG. 5 is, a cross section of the belt of the present invention.

FIG. 6 is a cross section of the belt of the present invention.

FIG. 7 is a cross-sectional side view taken through the middle of the belt of the present invention.

DETAILED DESCRIPTION OF THE PREFERRED EMBODIMENT

Figure 1:
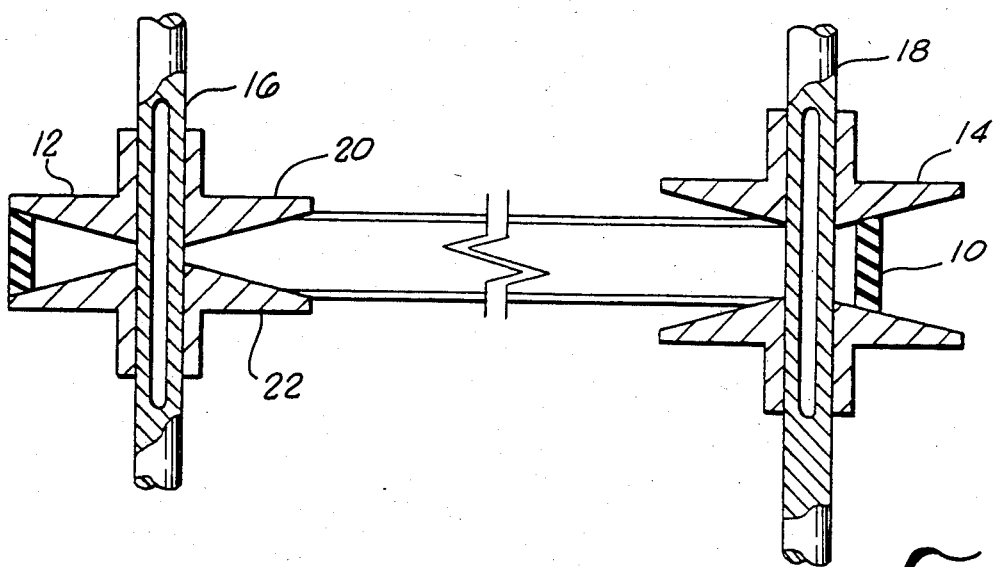
FIG. 1 is a prior art V-belt mechanism illustrated in cross section through the centerlines of the pulleys.

FIG. 1 illustrates a prior art device including a V-belt 10 of rubber or rubber-like construction, a first pulley 12 of metallic construction and a second pulley 14 also of metallic construction. The pulleys 12 and 14 are mounted on pulley shafts 16 and 18 respectively. These pulleys illustrated are of the variable ratio type wherein the conical sides or cheeks 20 and 22 of each pulley are capable of moving toward and away from each other such that the effective diameter of the pulley is varied responsive to speed or mechanical control.

Figure 2:
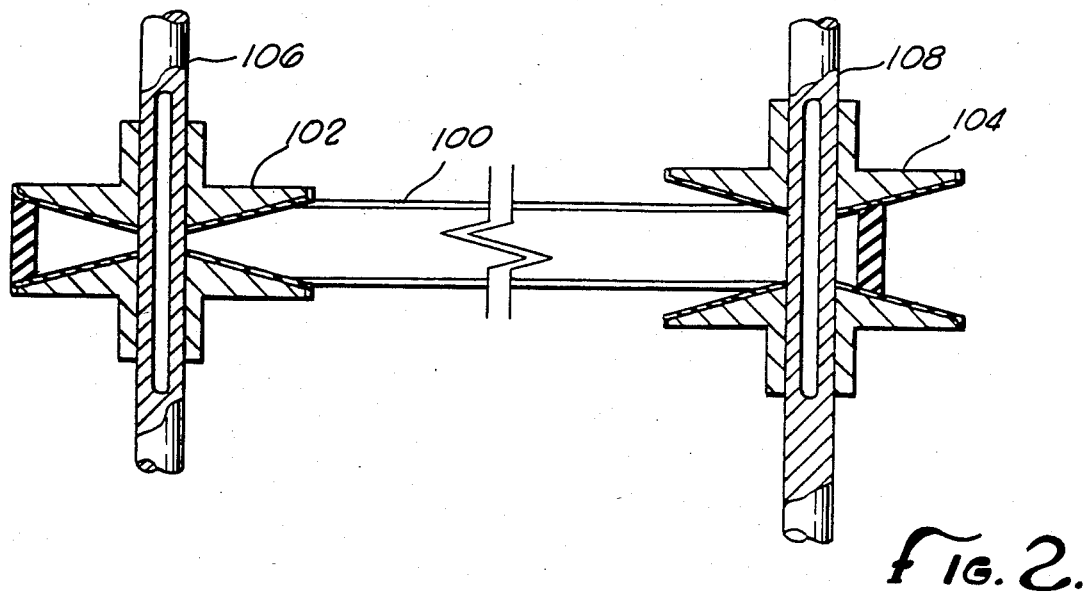
FIG. 2 is a cross section of an embodiment of the present invention taken through the centerline of the pulleys.
Figure 3:
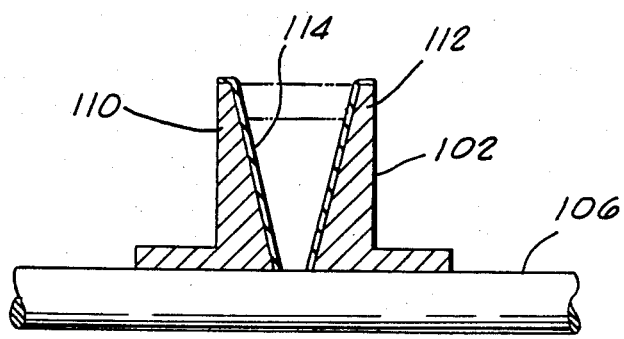
FIG. 3 is a cross-sectional detail of the device of FIG. 2.
Figure 8:
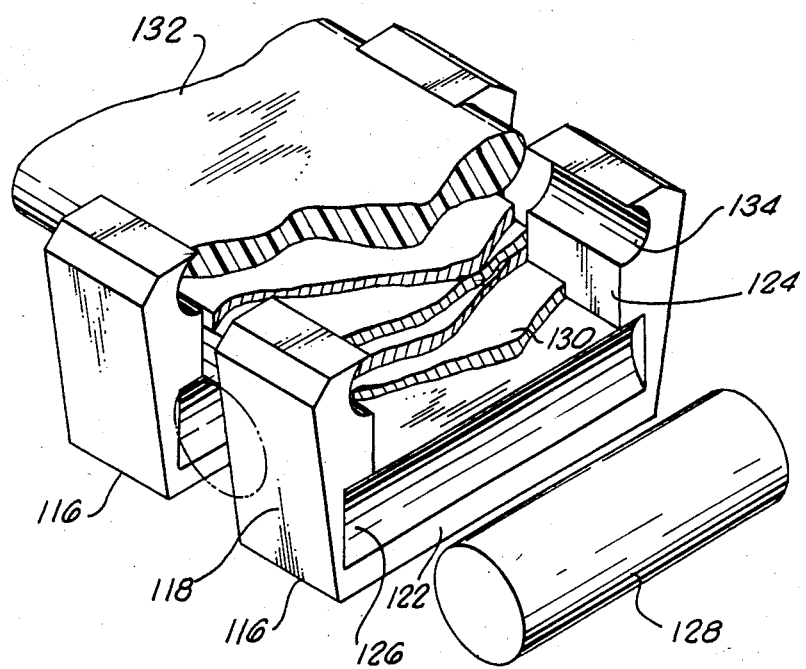
FIG. 8 is a partially assembled oblique view of a portion of the belt of the present invention with portions broken away for clarity.

FIGS. 2 and 3 illustrate a pulley mechanism of the present invention including a V-belt 100 extending between and about two pulleys 102 and 104. The pulleys 102 and 104 are mounted about shafts 106 and 108 respectively. Again, the pulleys are of the variable ratio type. The V-belt 100 is illustrated simply as a solid element. However, reference is made to FIGS. 4–8 as will be described below regarding the V-belt 100.

Each pulley includes an annular V-groove about the periphery of the pulley as defined between pulley halves 110 and 112. The pulley halves 110 and 112 form conical surfaces defining the inclined sides of the groove. Located on the conical surfaces of the pulley halves 110 and 112 are coatings 114. The coatings 114 thereby extend to form a coating across the full surface of the V-groove formed in each pulley. The coating is of rubber or rubber-like material which is preferably fused to the pulley halves. The coating 114 may be constituted according to the load conditions and working environment of the device. Adequate thickness is preferred for providing a resilient pulley surface. Thickness also gives additional abrasion longevity. On the other hand, coatings of substantial thickness may exhibit some structural weakness and inhibit heat transfer generated at the interface of the pulleys 102 and 104 and the belt 100. With a thin coating 114, heat transfer to the pulleys 102 and 104 for conduction and efficient radiation may be achieved. Thus, a compromise of design considerations results in a most advantageous and efficient design.

Looking then to the details of a V-belt of the preferred embodiment of the present invention, FIG. 4 illustrates a V-belt 100 located on two pulleys 102 and 104. The V-belt 100 is segmented to provide hard blocks of material which may conveniently be of metal.

These blocks include inclined faces of hard, wear-resistant material, such as metal, to define in combination a flexible surface capable of conforming to the annular V-groove of each pulley.

The V-belt construction includes blocks 116 varying in number depending on the length of the belt. The blocks 116 each include inclined surfaces 118 and 120. The inclined surfaces 118 and 120 define an angle of planar intersection theta as seen in FIG. 5. A body portion 122 extends between the sides of the block 116 to form a rigid structure capable of receiving substantial force against the surfaces 118 and 120 from the pulley. A cavity 124 is defined centrally within the block 116 to receive the tension members described below. The surfaces of the block 116, generally normal to the longitudinal direction of the belt 100, are parallel and include cavities 126 forming part of a cylinder. The cavities each have a length $l_1$ as seen in FIG. 5 and a radius of curvature $r_1$ as seen in FIG. 7. The cavities 126 form portions of cylinders which are less than half of a completed cylinder such that the block 116 may pivot about pins mounted within the cavities for flexure about the pulleys 102 and 104.

Positioned between the blocks 116 and mating with the cavities 126 are cylindrical pins 128. The cylindrical pins 128 each have a radius of curvature $r_2$ as seen in FIG. 7. Additionally, as seen in FIG. 5, each pin 128 has a length $l_2$. Preferably, the radius $r_1$ is greater than the radius $r_2$ and the length $l_1$ is greater than the length $l_2$ for free operation in bending of the belt 100.

To retain the V-belt 100 together and to resist the tension load within the belt, thin, continuous metallic belts 130 are threaded within the cavities 124 to define the belt. The belts 130 are relatively unstretchable but are thin enough to not significantly resist bending. Thus, tension in the belt 100 is accommodated while bending about the pulleys 102 and 104 is facilitated.

To insure retention of the assembly and enclose the strips 130, a continuous rubber-like belt 132 is used. The belt 132 extends to grooves 134 located on either side of the cavity 124 in each block 116 as can best be seen in FIG. 8. The rubber-like belt 132 is preferably substantially unstretchable to insure proper retension of the belt in place.

The assembly of the belt includes the first location of the strips 130 in the cavities 124 of the blocks 116. Next, the blocks 116 are stretched apart to receive the pins or rollers 128 within the cavities 126. Once all of the pins 128 have been positioned, the rubber-like belt 132 is distorted and placed down into the cavities 134 to complete the assembly. The rubber-like belt 132 is preferably sized to snugly fit into the cavities 134.

Thus, a belt having hard, wear-resistant surfaces is disclosed in combination with V-belts having resilient coatings in the V-grooves thereof. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A V-belt assembly comprising
a pulley having a V-groove with a coating of resilient material, and
a V-belt for engagement with said pulley, said V-belt including a continuous loop of a tension member having a thin metal tension member and a flexible tension member and a plurality of spaced blocks of metal having inclined faces, said blocks slidably mounted on said tension member, and
a roller positioned between adjacent sides of said spaced blocks to space said blocks during engagement with said pulley.

2. A V-belt assembly comprising
a pulley having a V-groove with a coating of resilient material, and
a V-belt for engagement with said pulley, said V-belt including a continuous loop of a tension member and a plurality of spaced blocks of metal having inclined faces, and blocks slidably mounted on said tension member, and
a roller positioned between adjacent sides of said spaced blocks to space said blocks during engagement with said pulley, adjacent sides of said spaced blocks of metal each including a recess conforming to a cylinder portion of said roller.

* * * * *